Jan. 5, 1960 P. D. BOYER 2,919,716
VALVES
Filed June 28, 1956 3 Sheets-Sheet 1

Jan. 5, 1960 P. D. BOYER 2,919,716
VALVES
Filed June 28, 1956

Inventor:
Patrick Desmond Boyer
by Bailey, Stephenson Huettig
ATTORNEYS

Jan. 5, 1960 P. D. BOYER 2,919,716
VALVES
Filed June 28, 1956 3 Sheets-Sheet 3

Inventor:
Patrick Desmond Boyer
by Bailey, Stephens & Huettig
ATTORNEYS

United States Patent Office 2,919,716
Patented Jan. 5, 1960

2,919,716

VALVES

Patrick Desmond Boyer, Rowley Green, Barnet, England, assignor to Elliott Brothers (London) Limited, London, England, a company of Great Britain Application June 28, 1956, Serial No. 594,639

Claims priority, application Great Britain June 29, 1955

24 Claims. (Cl. 137—620)

This invention relates to improvements in valves of the kind (hereinafter referred to as being of the "kind specified") in which the flow of fluid through a passage connecting two spaces containing fluid at different pressures is controlled by a valve element arranged to cooperate with at least a part of the passage or an annular seating surrounding one end of the passage and normally urged by means such as, for example, a spring or fluid pressure towards the passage or seating to interrupt or reduce the flow of fluid through the passage and in which actuating means is provided and arranged to be displaced from a zero position under the influence of a mechanical or electrical signal to engage the valve element and displace the latter axially away from the passage or seating.

In valves of the kind specified such as, for example, pilot valves for use in association with servo-motors or the like, it is desirable to control the relationship between the rate of flow of fluid from one space to the other with respect to the pressure difference of the fluid in the two spaces and the degree of axial displacement of the valve element under the control of the actuating means. This may be achieved by adjustment of the lap of the valve. The term "lap" as will be understood in the art, refers to the distance through which the valve element must be axially displaced from a zero-position or the distance through which the actuating means must be displaced from a zero position to displace the valve element, for communication between the two spaces to be established.

Thus, the term "under-lap" defines a condition in which the valve element assumes a zero-position in which it is spaced a predetermined distance from the passage between the spaces or the annular seating surrounding one end of the passage so that in this zero-position the two spaces are in permanent communication with each other and the term "over-lap" defines a condition in which, where the valve element is of the piston-type, the valve element enters the passage and assumes a zero-position from which it must be displaced axially through a predetermined distance to clear the passage and establish communication between the spaces or, where the valve element is of the type provided with an operative end capable of co-acting with an annular seating surrounding one end of the passage to close the latter, e.g. a poppet-type valve element, the valve element assumes a zero position in which it co-acts with the seating and the actuating means assumes a zero position relative to the valve element from which it must be displaced through a predetermined distance before becoming effective to unseat the valve element and establish communication between the two spaces.

It is an object of the present invention to provide an improved valve of the kind specified which shall be economic to manufacture and wherein the lap shall be capable of being readily adjusted whilst the valve is in use.

According to the present invention, in a valve of the kind specified, at least that part of the passage or the seating with which the valve element is arranged to cooperate is formed in an assembly which is movable relative to the actuating means such that movement of the assembly in one direction from a mean position relative to the actuating means causes the latter to co-operate with the valve element so as to move said part of the passage or said seating relative to the valve element to produce the condition of under-lap and movement of the assembly in the opposite direction from the mean position relative to the actuating means causes said part of the passage or the seating to cooperate with the valve element to cause the latter to assume a position relative to said part of the passage or the seating and the actuating means corresponding to that required for the condition of over-lap.

Preferably one of the spaces is provided in a housing and the other of the spaces is formed in the valve assembly which is adjustably disposed in said housing in a passage therein which communicates with said one space.

Advantageously two valves according to either of the two immediately preceding paragraphs may be incorporated in a single valve structure, one of the two spaces associated with each valve being common to both and being adapted to be connected to a pressure-responsive device, the other space associated with one valve being adapted to be connected to a first source of fluid under pressure and the other space associated with the other valve being adapted to be connected to a second source of fluid under a pressure different from that of the first source.

In a preferred embodiment of the invention a valve structure for selectively connecting a pressure responsive device, e.g. an actuator, to a source of fluid under pressure or to exhaust comprises a housing having a passage formed therethrough, two similar valve assemblies extending into said passage from opposite ends thereof to leave a first space between the inner ends of the assemblies, a passage formed in the housing and adapted to place the first space permanently in communication with the pressure responsive device, a second space formed in each valve assembly, two further passages formed in the housing and adapted one to place the second space of one assembly in communication with the source and the other to place the second space of the other assembly in communication with the exhaust, a passage formed in each assembly to extend between the first space and the associated second space, a valve element associated with each valve assembly and arranged so as to be capable of closing the passage formed in the associated valve assembly, actuating means disposed in the first space and arranged to be displaced from a zero position under the influence of a mechanical or electrical signal to engage one or other of the valve elements to displace it relative to the associated passage in the assembly, and means for adjusting the position of at least one of the assemblies axially in the passage to control the lap of the valve constituted by said one assembly, i.e., the magnitude of the movement of the actuating means required in the direction to open the further passage in said one assembly before the second space therein is in communication with the first space or the magnitude of the movement of the actuating means required in the direction to close the further passage in said one assembly before the associated valve element closes the further passage therein.

Some examples of the manner in which the invention may be carried into effect will now be described with reference to the accompanying drawings in which.

The valve structures to be described are each intended for establishing communication between the one end of the cylinder space of a piston-and-cylinder actuator and a supply of fluid under pressure or an exhaust connection, as the case may be, dependent upon the direction in which a control element is moved. Any suitable return means is provided for constantly urging the piston of the actuator towards that end of the cylinder space referred to above, the supply of pressure fluid to this end of the cylinder space causing the piston to move against the action of the return means.

Figure 1:
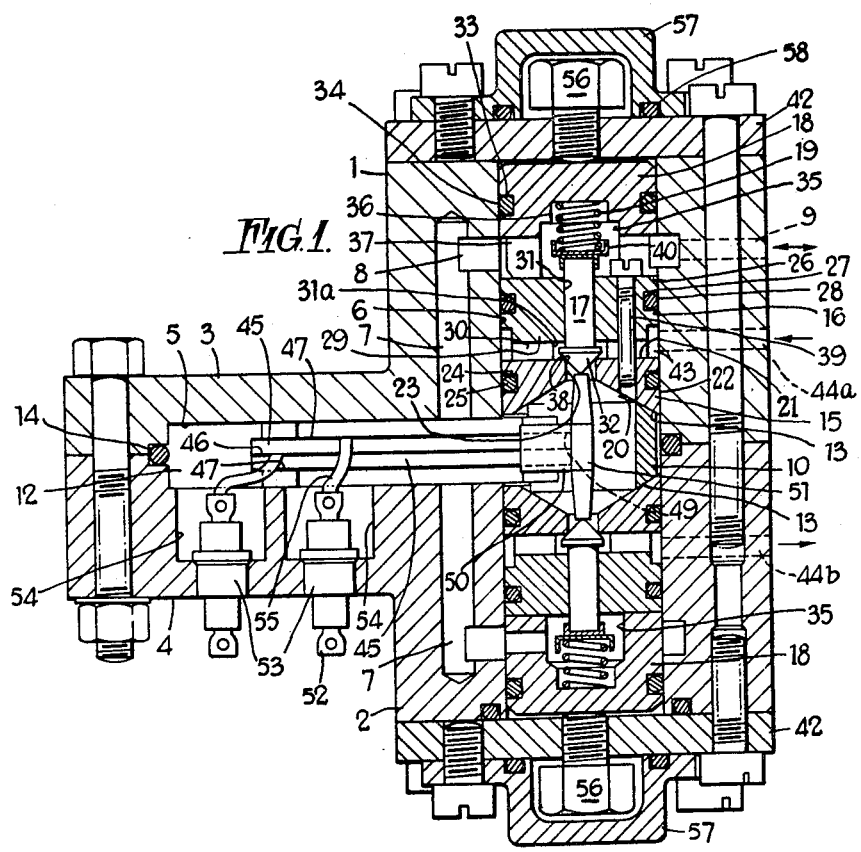
Fig. 1 is a section of a valve structure embodying two valves taken on the line I—I of Fig. 2, the valve assemblies being shown in their zero-lap position.
Figure 2:
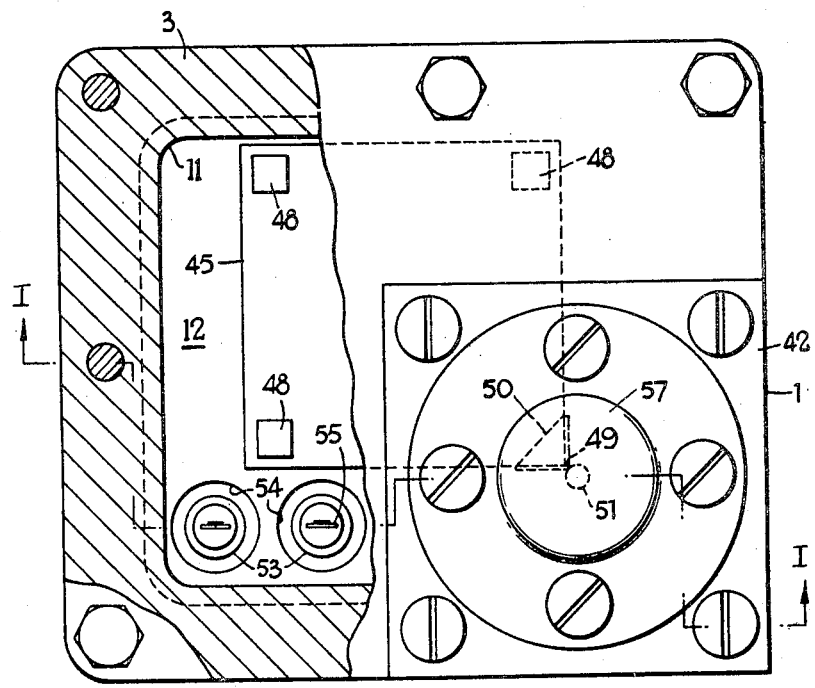
Fig. 2 is a plan view of the valve structure of Fig. 1 with part broken away.

In the first example illustrated in Figs. 1 and 2 the valve structure comprises upper and lower body parts indicated at 1 and 2 respectively, each of square cross-section, which are arranged to be secured together with their axes in alignment by means of square flanges 3 and 4 formed integrally therewith so that two of the sides of each flange coincide with two of the sides of the respective body part. The flange 4 on the lower part 2 is thicker than that on the upper part 1 and each flange 3 and 4 is formed with a square recess 5 in its mating face into which opens a cylindrical bore 6 formed axially through the respective body part 1 and 2. There also opens into the recess 5 in each flange a passage 7 formed in the corresponding body part parallel with the bore 6 and communicating near its outer and closed end with an annular groove 8 formed in the wall of the bore 6. The groove in the upper part 1 is adapted to be placed in permanent communication with the cylinder space of the actuator (not shown) by way of a radially directed passage 9 in the body part 1.

Within each bore 6 is slidably engaged, as a loose fit, a valve assembly (described below), the two assemblies being exactly alike and being separated from each other by a part-annular spring 10 which has its gap directed towards the most remote corner 11 (Figure 2) of the square chamber 12 formed by the two recesses 5 and has its upper and lower edges indicated at 13 sloped inwards and upwards and inwards and downwards, respectively. The spring 10, when unstressed, is a close fit in the end parts of the respective bores 6 in the body parts 1 and 2 and the square chamber 12 is surrounded by a fluid-tight seal 14. Each valve assembly comprises a seat element 15, a valve guide 16, a valve element 17, a backing member 18 and a valve spring 19. The seat element 15 is an annulus having its inner face 20 coned to the same inclination as the adjacent edge 13 of the part-annular spring 10, its outer face 21 contained in a plane normal to the axis of the annulus, its external cylindrical surface 22 a loose fit in the bore 6 in the body part and its internal cylindrical surfaces 23 coaxial with the external surface 22 but of much smaller diameter. The external surface 22 is grooved circumferentially as at 24 to accommodate a sealing ring 25. The valve guide 16 is a short cylinder having its outer end 26 made a loose fit in the bore 6 in the body part and grooved circumferentially as at 27 to accommodate a sealing ring 28 while its inner end 29 is of smaller diameter and formed with one or more diametral grooves 30. It is formed also with an axial bore 31 which is enlarged somewhat at its inner end as at 31a. The valve element 17 is a cylindrical rod, which is of the same diameter as the internal bore 23 of the seat element 15 and is a close sliding fit in the bore 31 in the valve guide 16 but of greater length than the same, carrying at its inner end a head 32 the base of which is of smaller diameter than the enlarged portion 31a of this bore 31 but of larger diameter than the internal cylindrical surface 23 of the seat element 15. The head 32 is formed to a conical shape, the included angle of the cone being 90°. The backing member 18 is a short cylinder of a diameter such that it would be a loose fit in the bore 6 in the body part and has a circumferential groove 33 to accommodate a sealing ring 34. From the inner end of the backing member 18 there is formed an axially extending cylindrical recess 35 which is stepped down at 36 to a smaller diameter at its closed end. One or more diametral grooves 37 are formed across the inner end of the backing member 18 the axial length of which is such that, when the seat element 15, valve guide 16, and backing member 18 are assembled end-to-end, the inner face of the seat element 15 will bear on the part annular spring 10 and the outer face of the backing member 18 will be located just within the outer end of the bore 6 in the body part.

The various parts are assembled by first passing the rod portion of the valve element 17 into the axial bore 31 in the valve guide 16 and then placing the seat element 15 against the inner face of the valve guide 16 so that the conical head 32 on the valve element 17 is engaged by the seating 38 constituted by the edge at which the outer plane face 21 of the seat element 15 meets the inner cylindrical surface 23 of the latter. The seat element 15 and valve guide 16 are secured together by means of screws 39, or the like, in co-axial relation and the sub-assembly thus produced is inserted into the respective bore 6 so that the inner face 20 of the seat element 15 bears upon the adjacent edge 13 of the part annular spring 10. A suitable cup 40 is then mounted on the outer projecting end of the valve element 17 and the helical valve spring 19 is engaged by its one end in the cup 40. Finally, the backing member 18 is inserted into the outer end of the bore 6 so that the other end of the spring 19 will be received within the smaller diameter portion 36 of its axial recess 35, and an end plate 42 is then secured to the outer end of the appropriate body part so that the valve assembly cannot be displaced out of the bore. When thus disposed, the ends of the grooves 37 in the respective backing member 18 are located opposite the annular groove 8 formed in the wall of the bore 6 of the respective body part. Moreover, the annular groove 43 which is defined by the adjacent ends of the seat element 15 and the valve guide 16 is located opposite to a passage 44a or 44b formed through the appropriate body part 1 or 2 respectively, the passage 44a (the upper one) being connected to a source of fluid under pressure, whereas the other passage 44b is an exhaust connection which may lead to a region of low pressure, such as a drain or other discharge to atmosphere.

The square chamber 12 formed by the recesses 5 in the mating faces of the flanges 3 and 4 on the body parts 1 and 2 respectively has secured therein a crystal transducer which consists of two slabs 45 of 45° X-cut Rochelle salt cemented together with a layer 46 of silver foil between them. This is coated with graphite to ensure an electrical bond with the crystal. The outer surfaces of the crystal are also coated with foil as at 47 and the whole is dipped in a material such as that sold under the registered trademark "Alkathene" to seal and insulate it. The electrical axes of the two slabs 45 are arranged perpendicular to each other so that a flexure occurs when opposite potentials are applied to the inner and outer foil layers 46 and 47. The crystal is mounted within the chamber 12 with three of its corners located between stiff pads 48 and clamped so that any flexure of the crystal is confined largely to the fourth or free corner indicated at 49. A suitable mounting 50 is fixed on this corner 49 of the crystal and carries a hammer 51 of red like form which is disposed coaxially with the two opposed valve elements 17. The length of the hammer 51 is such that in a mean position of the two valve assemblies within the respective bores 6, the respective ends of the hammer 51 may just contact the apices of the conical heads 32 on the valve elements 17 when the conical heads 32 of the latter engage the associated seating 38. Means for applying an electric potential to foil layers 46 and 47 of the crystal is provided and comprises in each case a terminal element 52 passing through a sleeve 53 of insulating material secured in a fluid-tight manner in an appropriate aperture formed in the base of a circular well 54 bored in the base of the recess 5 in the flange 4 on the lower body part 2. The electrical connection from each terminal 52 to the respective foil layer 46 or 47 is made in the usual way through a flexible strip 55, or the like. Consequently, when a signal of one polarity is applied to the foil layer 46 and a signal of opposite polarity is applied to the foil layer 47, the hammer 51 will be moved upwards substantially axially of the bore 6 in the body parts 1 and 2, whereas when the signal applied to the respective foil layers 46 and 47 is of the opposite polarity the hammer 51 will be moved in the opposite direction.

Figure 3:
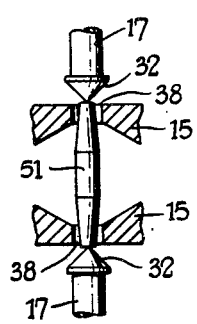
Fig. 3 is an enlarged fragmentary view showing part of the valve structure of Fig. 1 with the valve assemblies adjusted for under-lap.
Figure 4:
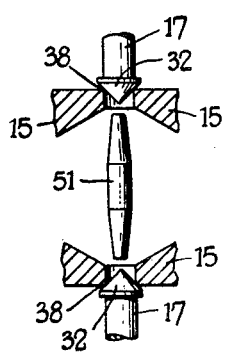
Fig. 4 is a view similar to Fig. 3 showing the valve assemblies adjusted for over-lap.

The range of movement required of the valve elements 17 is extremely small, i.e. not more than five thousands of an inch so that the range of movement of the hammer 51 is also extremely small and it is necessary to ensure that the opposed valve elements 17 are correctly disposed relative to the associated seating 38 and the hammer 51 when the hammer 51 is in its mid or zero position. Adjustment of the position of the valve assemblies in their respective bores 6 is effected by providing an adjusting screw 56 in each of the end plates 42 so that it may be screwed into or out of the latter to bear upon the outer face of the respective backing member 18. Due to provision of the part annular spring 10, it is possible, by adjustment of the screws 56, to move the two valve assemblies towards each other from their mean position of zero-lap condition as shown in Figure 1 to the position for under-lap shown in Figure 3, the spring 10 being thereby stressed and caused to contract somewhat. As the ends of the hammer bear upon the heads 32 of the valve elements 17, the seatings 38 move away from the associated head 32 to a degree controlled by the adjustment of the screws 56 to produce the condition of under-lap in the two assemblies shown in Figure 3. The opposite effect may be achieved by adjusting the screws 56 to permit the assemblies to move away from each other from their mean position to the position shown in Figure 4 either under the influence of the spring 10 or of the pressure of the fluid in the chamber 12, so that the heads 32 of the valve elements 17 remain seated on the seatings 38 and are carried away from the associated end of the hammer 51 by a distance determined by the adjustment of the screws 56 so that the hammer 51 has a certain lost motion, i.e. it must be displaced through a small distance before engaging the head 32 to lift the latter from the seating. This is the condition of over-lap. Moreover, the two valve assemblies together with the spring 10 may be moved bodily in the one or other direction axially of the bores 6 in the body parts 1 and 2. In this way it is possible to secure the necessary fine adjustments of the two valve elements 17 to produce a desired condition of under-lap, over-lap, or zero-lap as desired whilst the valves are in use.

The operation of the valve structure described will be clear from the foregoing description, but it may be mentioned briefly that, when the valve elements 17 are both arranged with their heads 32 in line engagement with their seatings 38 when the hammer 51 is in its mid-position, while at the same time the ends of the hammer 51 are just contacting the apices of the heads 32 of the valve elements 17, when a signal is applied to the respective foil layers 46 and 47 of the crystal, the hammer 51 will move upwards and displace the upper valve element 17 away from its seating 38. Communication is then established between the source (not shown) of fluid under pressure, and the passage 23 through the seat element 15 so that pressure fluid may flow into the space within the part annular spring 10 and thence through the square chamber 12 into the passages 7 formed in the body parts 1 and 2, the pressure fluid then flowing into the two annular grooves 8 in the wall of the bores 6 in these parts. It will be seen that the pressure fluid is then able to flow to the actuator through the passage 9 while at the same time acting on the upper and lower ends of the upper valve element 17, so that the fluid pressures on this element 17 will balance out. Similarly, the pressure fluid gains access to the recess 35 in the lower backing member 18 so that the fluid pressures acting on the lower valve element 17 will also balance out. This lower valve element 17, therefore, remains in contact with its seating 38 under the action of the associated valve spring 19.

When potentials of opposite sign are applied to the respective foil layers 46 and 47 the hammer 51 moves downwards and displaces the lower valve element 17 from its seating, thereby establishing communication between the space within the part annular spring 10 and the passage 44b leading to the exhaust connection, the upper valve element 17 being in this case held in contact with its seating 38 under the action of its valve spring 19. When the valve assemblies are adjusted to produce the condition of under-lap, the heads 32 of the valve elements 17 will always be spaced from their associated seating 38 when the hammer 51 is in its mid or zero position and displacement of the hammer 51 in one direction will cause one valve element 17 to move further away from its seating whilst the other valve element moves towards its seating or raising or lowering the driving pressure applied to the actuator piston and in conjunction with the constant actuator restoring urge causing the actuator to move in the desired sense. When the valve assemblies are adjusted to produce the condition of over-lap shown in Figure 4, the motion of the hammer 51 in one or other direction will have a certain lost motion before lifting one of the valve elements 17 from its associated seating 38.

In order to ensure against leakage of pressure fluid, the heads of the adjusting screws 56 in the end plates 42 are covered by caps 57 secured to the end plates 42 with the interposition of sealing rings 58.

Figure 5:
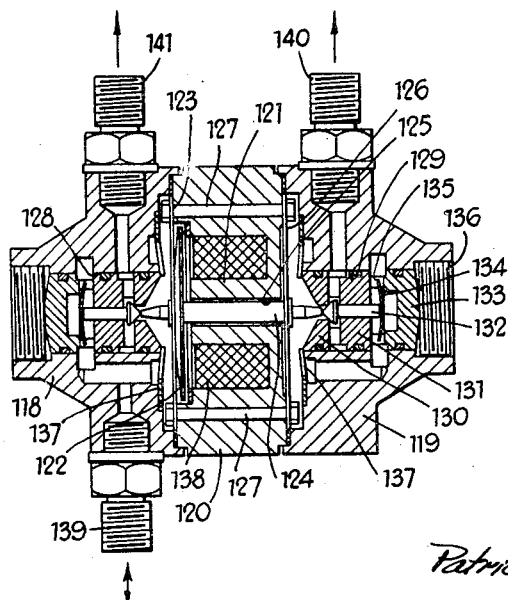
Fig. 5 is a view similar to Fig. 1 showing a section of an alternative valve structure.

The second example of a valve structure embodying the present invention is illustrated in Figure 5 and is similar in many respects to the first example illustrated in Figures 1 and 2. In this case the structure comprises a two-part valve housing indicated at 118 and 119 respectively in which the two parts are spaced axially from each other by an iron core 120 of pot type and of E-shape in axial section, the central limb 121 of this core being arranged coaxially with the parts 118 and 119 and the whole being assembled in a fluit tight manner. The iron core 120 is bridged by an armature disc 122 which is carried on a leaf spring 123 and is movable axially of the valve housing. A rod-like hammer element 124 extends through a bore 125 formed coaxially in the limb 121 and projects from and is connected to the armature 122 and the leaf spring 123 at one end and at the other end is secured to and projects through a further leaf spring 126 such that axial movement of the hammer element 124 and armature 122 is opposed by the leaf springs 123 and 126, the leaf springs 123 and 126 being secured at their ends to the core 120 by bolts 127. Each part 118 and 119 is bored axially as at 128 and 129 respectively to receive a valve assembly which, as in the first example, comprises a seating element 130, a valve guide 131, a valve element 132, a backing member 133 and a valve spring 134. In this case the valve spring 134 is of spider or cruciform shape, the legs of which are engaged in notches 135 formed in the annular wall on the inner end face of the backing member 133. This spring 134 operates in the same way as the helical spring 19 of the first example to urge the valve element 132 against its seating.

An adjusting member or plug 136 is threaded into the outer end of the bore in each part to bear against the rear face of the backing member 133 so as to adjust the position of the valve assembly within the bore 128 or 129 against the action of a spring. Thus the position of the valve assemblies may be adjusted whilst the valve is in use to produce the condition of over-lap or under-lap as desired. In this example the spring controlling the position of the valve assemblies is a flat annular spring 137 which is secured within the housing and which is formed with a plurality of slits in its inner circumference, its inner marginal edge being arranged to engage the inner end of the seating element 130 to oppose inward movement of the valve assembly. The limb 121 of the core 120 is surrounded by a coil 138 the leads to which are brought outside the housing. When an electric current is passed through the coil the armature 122 is attracted to the core 120 and produces a corresponding axial movement of the hammer element 124.

In this arrangement valves are set up to a zero-lap condition by first passing a standing current of predetermined magnitude through the coil 138 to cause the armature to assume a mean or zero position against the action of the leaf springs 123 and 126. The axial position of the valve assemblies in their respective bores is then adjusted by means of the adjusting plugs 136 so that the coned head of each valve element 132 just makes contact with the respective end of the hammer element 124. The position of the valve assemblies in their respective bores 128 and 129 may then be adjusted by means of the plugs 136 to a position of under-lap or over-lap corresponding to that shown in Figures 3 and 4 respectively, as desired. This adjustment may be effected whilst the valves are in use.

In the operation of this arrangement, a signal in the form of an electric current is superimposed upon the standing current and, in accordance with the polarity of such signal, increases or reduces the effect of the standing current to cause the armature 122 and the hammer element 124 to move axially of the housing in one direction or the other to push one or other valve element 132 off its seating against the action of the spring 134 and place the passage 139 connected externally to an actuator, either in communication with the low pressure inlet 140 or the high pressure inlet 141.

In this arrangement where it is desired that the deflection of the valve elements should be a linear function of the signal applied to the winding 138 in the third example it will be appreciated that such linearity may be achieved by suitable design of the leaf springs 123 and 126 or any other suitable suspension system which may be employed.

Due to the construction of the valve elements and seatings in accordance with this invention, the unbalanced forces exerted on the valve elements by the fluid, and which have therefore to be overcome by the operating device, are reduced to a very low value.

Figure 6:
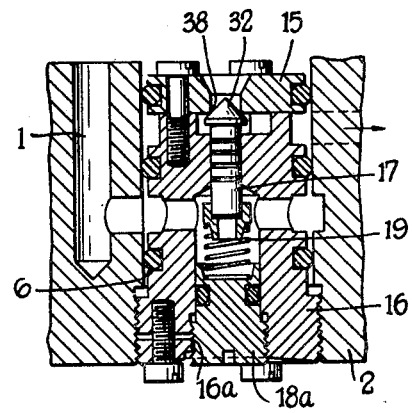
Figs. 6–10 show examples of various types of valve assemblies which may be incorporated in valve structures such as those shown in Figs. 1 and 3.

The valve assembly illustrated in Figure 6 is suitable for use in a valve structure such as that illustrated in Figures 1 and 5 and is similar in many respects to the assemblies described in relation to Figure 1 and like reference numerals are used to indicate similar parts. In this case the axial length of the valve guide 16 is greater than that of valve element 17 and the guide is threaded adjacent its outer end to engage the outer end of the bore 6 of the housing 2 which is correspondingly threaded. The backing member indicated 18a is a threaded plug which is threaded into a bore 16a in the guide 16 to bear against the valve spring 19. It will be apparent that when the assembly is disposed in the bore 6 its axial position may be readily adjusted to control the lap by screwing it into or out of the bore 6 to a predetermined degree. Also the compression of the spring 18 may be controlled by adjusting the position of the backing member 18a in the bore 16a. In this case the part annular spring 10 described with reference to Fig. 1 is not required.

Figure 7:
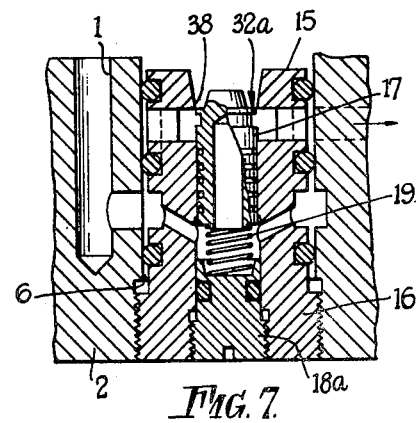

The assembly illustrated in Fig. 7 is similar in most respects to that described with reference to Fig. 6 but in this case the valve element 17 is of the piston type the operative end thereof indicated at 32a being cylindrical and arranged to cooperate with the annular lateral seating 38 formed on the annular element 15. As the valve element is of the piston type the element 15 is conveniently made integral with the guide 16. It will be seen that the assembly so produced is not complicated to manufacture.

Figure 8:
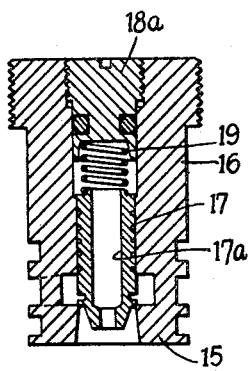
Figure 9:
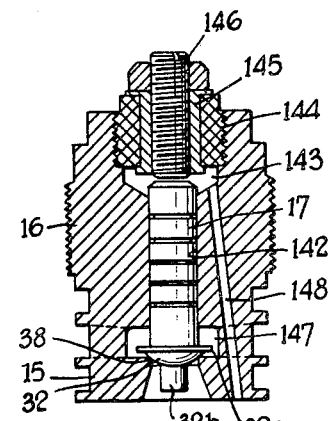
Figure 10:
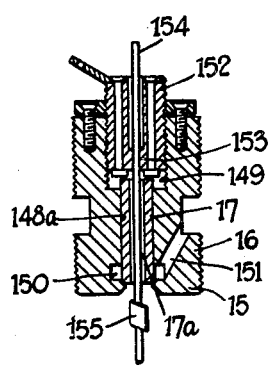

The assembly illustrated in Fig. 8 is substantially the same as that illustrated in Fig. 7 but in this case the valve element is formed with a co-axially extending passage 17a whereby the fluid pressures on the valve element 17 balance out. In this case the passages 7 in the body parts 1 and 2 (Fig. 1) are no longer necessary nor are the passages in the assembly for placing the rear end of the valve element 17 in communication therewith. Fig. 9 illlustrates a valve assembly having a valve element of the poppet type in which the operative end 32 is formed from a steel ball and is provided with an axial extension 32b and a hat brim-shaped extension 32c to control the forces on the element set up when fluid flows past the seat 38. The valve guide 16 is formed integral with the seat element 15 and is of substantially cylindrical form having a threaded outer end for adjustment of the assembly in the bore 6 of the housing. The stem of valve element 17 extends through a coaxial passage 142 which is enlarged at its outer end to form a small chamber 143 which is closed by a plug 144 of electrically insulating material through which passes a metal sleeve 145 in which latter is threaded a limit-stop 146 which serves to limit the stroke of the valve element 17. The passage 142 is enlarged adjacent its inner end to form a chamber 147 which is adapted to be placed in communication with a source of fluid under pressure and the inner end of the passage 142 is of slightly reduced diameter to provide the valve seating 38 adapted to cooperate with the operative end 32 of the valve element 17. The diameter of the inner end of the passage 142 may be slightly reduced as described or it may be enlarged according to whether the valve is to be used as an exhaust or an inflow valve. The occasional object is to provide hydro-static unbalance which will force close the valve to a predetermined pre-load, usually very small. A balance gallery or passage 148 extends through the guide 16 from the inner end face thereof to the chamber 143 to balance the fluid pressures on the valve element 17. Fig. 10 illustrates a valve assembly in which the valve guide 16 is of substantially cylindrical form with the seat element 15 formed integrally therewith. The valve guide 16 is threaded externally for adjustment in bore 6 in the housing to adjust the lap of the valve and the valve element 17 which is of cylindrical form with a coaxial balancer passage 17a therethrough extends through the coaxial passage 148a which opens at its outer end into a small chamber 149 and at its inner end into a space 150 adapted to be placed in communication with a source of fluid under pressure by way of the passage 151. The chamber 149 is closed by an adjustable limit stop 152 having a passage 153 extending therethrough and a wire rod 154 extends as a close sliding fit through this passage 153 and with clearance through the balance passage 17a. The rod 154 is formed intermediate its length with a blade shaped enlargement 155 which is to constitute the hammer and which is adapted upon displacement of the wire 154 to engage the inner end of the valve element 17 to lift it from its seating. The same wire 154 extends through a similar valve assembly disposed opposite the one shown in a manner which will be readily understood.

In those cases, such as those illustrated in Figures 8 and 10 where a balancer passage extends through the valve element 17 the end of the hammer element adapted to engage the valve element is shaped so that when it does engage the valve element the balancer passage is not blanked off.

The housing parts 1 and 2 (Figure 1) or 118 and 119 (Figure 5) may, if desired, be electrically insulated from each other so that contact between the ends of the hammer and the associated valve element may be detected by connecting the housing parts each to the same pole of a D.C. supply and connecting the hammer element to the other pole thereof.

Thus when the appropriate assembly is adjusted until the valve element just contacts the hammer element, an electric current will flow in the circuit and may be utilised to produce an indication of this condition.

What I claim is:

1. A valve mechanism comprising a housing having a passage open to the exterior of said housing, a valve assembly disposed within said passage in fluid-tight relationship and adjustable longitudinally in said passage from the exterior of said housing, said valve assembly comprising a valve guide, a valve seating element and a valve element adapted to cooperate with said seating element and at least partly defining a first space, a second space and at least part of a third space, said first and third spaces being permanently in communication with each other and said valve seating element being disposed between said second and third spaces and being adapted in combination with said valve element to control the flow of fluid between said second and third spaces and said valve seating element being fixed in relation to said valve guide so as to be moved simultaneously with the latter upon adjustment of said assembly from the exterior of the housing, an actuating member disposed at a zero-position at least partly in said third space and having an operative end adapted to engage said valve element and displace the latter from said seating element and actuating means operable to displace said actuating member from said zero-position relative to said valve element, adjustment of said valve assembly within said passage controlling simultaneously the relative positions of said valve seating element, said valve element and said operative end of said actuating member to control the lap of the valve element relative to the valve seating and the operative end of the actuating member.

2. A valve mechanism according to claim 1 wherein said valve guide and said valve seating element are secured to each other.

3. A valve mechanism according to claim 1 wherein said valve guide and said valve seating element are formed integrally with each other.

4. A valve mechanism according to claim 1 wherein spring means is disposed in said assembly bearing on said valve element to urge the latter towards said valve seating element.

5. A valve mechanism according to claim 4 wherein means is provided operable from the exterior of said housing to control the tension in said spring means.

6. A valve mechanism according to claim 5 wherein said tension controlling means comprises screw means threadedly engaged and adjustable in said valve assembly and said spring means is disposed in said first space between said screw means and said valve element.

7. A valve mechanism according to claim 1 wherein spring means is disposed in said third space in engagement with said valve assembly to urge the latter towards the exterior of the housing.

8. A valve mechanism according to claim 1 wherein at least a part of said valve guide threadedly engages said passage in the housing whereby said valve assembly is longitudinally adjustable therein.

9. A valve mechanism comprising a housing having a passage therein open to the exterior of said housing, a valve assembly disposed at least partly within said passage in fluid-tight relationship and threadedly engaging said passage so as to be longitudinally adjustable therein from the exterior of said housing, said valve assembly at least partly defining a first space, a second space and a third space and comprising a valve guide, a valve seating element and a valve element adapted to cooperate with said seating element, said valve element being exposed at its opposite ends to any fluid pressure prevailing in said first and third spaces respectively, said first and third spaces being in permanent communication with each other and said valve seating element being disposed between said second and third spaces and being adapted in combination with said valve element to control the flow of fluid between second and third spaces and said valve seating element being fixed in relation to said valve guide so as to be moved simultaneously with the latter upon adjustment of said assembly from the exterior of the housing, spring means disposed at least partly in said third space in engagement with said valve assembly to oppose any longitudinal adjustment of said assembly into said passage, an actuating member disposed at a zero-position at least partly in said third space and having an operative end engageable with said valve element to displace the latter away from said seating element, adjustment of said valve assembly within said passage controlling simultaneously the relative positions of said valve seating element, said valve element and said operative end of said actuating member to control the lap of said valve element relative to said valve seating and the operative end of the actuating member, and actuating means operable to displace said actuating member from said zero-position.

10. A valve mechanism according to claim 9 wherein a passage is formed in said assembly whereby said first and third spaces are in permanent communication.

11. A valve mechanism according to claim 10 wherein said passage in said assembly is provided in said valve element.

12. A valve mechanism according to claim 9 wherein a further passage is formed in said housing whereby said first and third spaces are in permanent communication.

13. A valve mechanism according to claim 9 wherein said valve element is of the poppet type and is provided with an operative part and said valve seating element is formed with an annular seating with which said operative part of said valve element is adapted to cooperate.

14. A valve element according to claim 9 wherein said valve element comprises an operative part adapted to cooperate with said seating element and a stem part disposed at least partly within said valve guide, said stem part being formed with at least one annular groove to reduce sticking.

15. A valve mechanism comprising a housing having at least two passages therein each open at their one ends to the exterior of said housing, a separate valve assembly associated with and disposed at least partly within each passage in fluid-tight relationship and adjustable longitudinally within the associated passage from the exterior of said housing, each valve assembly at least partly defining a first space and a second space and a third space common to both assemblies, said third space being in permanent communication with each of said first spaces, each valve assembly comprising a valve guide, a valve seating element fixed relative to said valve guide and disposed between said third space and the associated second space and a valve element adapted to cooperate with the associated valve seating element to control the flow of fluid between said third space and the associated second space and each valve element being exposed at its opposite ends to any fluid pressure prevailing in said third space and the associated first space respectively, spring means disposed at least partly in said third space in engagement with each valve assembly to oppose any longitudinal adjustment of each of said valve assemblies into the associated passage, an actuating member disposed at a zero-position at least partly in said third space and having a separate operative part engageable with each valve element to displace the latter from its associated seating element, adjustment of each valve assembly within the associated passage controlling simultaneously the relative positions of the associated valve seating element the associated valve element and the associated operative part of said actuating member to control the lap of the associated valve element relative to its associated seating element and the associated operative part of the actuating member and actuating means operable to displace said actuating member from said zero-position.

16. A valve mechanism according to claim 15 wherein the other ends of said two passages open into said third space and said two passages are substantially co-axial.

17. A valve mechanism comprising a housing having at least two passages therein each open at their one ends to the exterior of said housing, a separate valve assembly associated with and disposed at least partly within each passage in fluid-tight relationship and threadedly engaging the associated passage so as to be longitudinally adjustable therein from the exterior of said housing whilst maintaining said fluid-tight relationship, each valve assembly defining at least partly a first space and a second space and a third space common to both assemblies, said third space being in constant communication with each of said first spaces, each valve assembly comprising a valve guide, a valve seating element fixed relative to said valve guide and disposed between said third space and the associated second space and a valve element exposed at its opposite ends to the fluid pressure prevailing in said third space and the associated first space respectively and adapted to cooperate with the associated valve seating element to control the flow of fluid between said third space and the associated second space, first spring means disposed in each first space and operative to exert a force on the associated valve element to urge the latter towards the associated valve seating element, second spring means disposed at least partly in said third space in engagement with each valve assembly to oppose any longitudinal adjustment of each of said valve assemblies into the associated passage, an actuating member disposed at a zero-position at least partly in said third space and having a separate operative part engageable with each valve element to displace the latter from its associated seating element, adjustment of each valve assembly within the associated passage controlling simultaneously the relative positions of the associated valve seating element, the associated valve element and the associated operative part of said actuating member to control the lap of the associated valve element relative to its associated seating element and the associated operative part of the actuating member and actuating means operable to displace said actuating member from said zero position.

18. A valve mechanism according to claim 17 wherein the force exerted by said first spring means on the associated valve element is adjustable from the exterior of said housing by means of a plug threadedly engaging a part of said valve assembly in a fluid-tight manner and bearing upon said first spring means.

19. A valve mechanism according to claim 17 wherein a third passage is formed in said housing communicating by its one end with said third space and adapted to communicate by its other end with a pressure responsive device, a fourth passage is formed in said housing communicating by its one end with the second space of one valve assembly and adapted to communicate by its other end with a source of fluid under pressure and a fifth passage is formed in said housing communicating by its one end with the second space of the valve assembly and adapted to communicate by its other end with an exhaust.

20. A valve mechanism comprising a housing having a passage open to the exterior of said housing, a valve assembly disposed within said passage in fluid-tight relationship and adjustable longitudinally in said passage from the exterior of said housing, said valve assembly comprising a valve guide, an annular element and a valve element adapted to cooperate with said annular element and at least partly defining a first space, a second space and at least part of a third space, said first and third spaces being permanently in communication with each other and said annular element being disposed between said second and third spaces and being adapted in combination with said valve element to control the flow of fluid between said second and third spaces and said annular element being fixed in relation to said valve guide so as to be moved simultaneously with the latter upon adjustment of said assembly from the exterior of the housing, an actuating member disposed at a zero-position at least partly in said third space and having an operative end adapted to engage said valve element and displace the latter from said annular element and actuating means operable to displace said actuating member from said zero-position relative to said valve element, adjustment of said valve assembly within said passage controlling simultaneously the relative positions of said annular element, said valve element and said operative end of said actuating member to control the lap of the valve element relative to the annular element and the operative end of the actuating member.

21. A valve mechanism according to claim 20 wherein said valve guide and said annular element are secured to each other.

22. A valve mechanism according to claim 20 wherein said valve guide and said annular element are formed integrally with each other.

23. A valve mechanism according to claim 20 wherein spring means is disposed in said assembly bearing on said valve element to urge the latter towards said annular element.

24. A valve mechanism according to claim 20 wherein said valve element is of the piston type.

References Cited in the file of this patent

UNITED STATES PATENTS

| | | |
|---|---|---|
| 1,751,276 | Karibo | Mar. 18, 1930 |
| 2,630,136 | Brandes | Mar. 3, 1953 |
| 2,679,829 | Gorrie | June 1, 1954 |